(12) United States Patent
Cragun

(10) Patent No.: US 7,512,665 B1
(45) Date of Patent: Mar. 31, 2009

(54) CHAINED UNIFORM RESOURCE LOCATORS

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1701 days.

(21) Appl. No.: 09/641,184

(22) Filed: Aug. 17, 2000

(51) Int. Cl.
*G06F 15/16* (2006.01)
(52) U.S. Cl. .................................... 709/217; 709/203
(58) Field of Classification Search ............... 707/10, 707/501; 370/350–354; 709/202, 203, 217, 709/219, 229
See application file for complete search history.

(56) References Cited

U.S. PATENT DOCUMENTS

| | | | | |
|---|---|---|---|---|
| 5,774,123 A | * | 6/1998 | Matson | 715/854 |
| 5,809,250 A | * | 9/1998 | Kisor | 709/227 |
| 5,890,181 A | * | 3/1999 | Selesky et al. | 715/530 |
| 5,918,012 A | * | 6/1999 | Astiz et al. | 709/217 |
| 6,199,077 B1 | * | 3/2001 | Inala et al. | 709/218 |
| 6,212,522 B1 | * | 4/2001 | Himmel et al. | 707/10 |
| 6,219,679 B1 | * | 4/2001 | Brisebois et al. | 715/501.1 |
| 6,535,912 B1 | * | 3/2003 | Anupam et al. | 709/217 |
| 6,546,002 B1 | * | 4/2003 | Kim | 370/351 |
| 6,549,217 B1 | * | 4/2003 | De Greef et al. | 345/745 |
| 6,725,227 B1 | * | 4/2004 | Li | 707/102 |

* cited by examiner

*Primary Examiner*—David Lazaro
(74) *Attorney, Agent, or Firm*—Patterson & Sheridan, LLP

(57) ABSTRACT

A method, article of manufacture, system and data structure providing a chained or compound URL including a base URL and all subsequent navigation steps necessary to access a desired resource such as a responsively instantiated resource or framed resource.

12 Claims, 8 Drawing Sheets

CHAINED UNIFORM RESOURCE LOCATORS

BACKGROUND OF THE INVENTION

1. Field of the Invention

The invention relates to communications systems utilizing network addresses such as uniform resource locators (URLs).

2. Background of the Related Art

The Internet is a global set of interconnected computer networks communicating via a protocol known as the Transmission Control Protocol and Internet Protocol (TCP/IP). The World Wide Web (WWW) is a fully distributed system for sharing information that is based upon the Internet. Information shared via the WWW is typically in the form of Hyper-Text Markup Language (HTML) pages. A display screen presented to a user via, e.g., a browser program, may comprise a singe HTML page or a plurality of HTML pages running within respective frames. An exemplary browser program comprises the Netscape® Navigator browser provided by Netscape Communications Corporation of Mountain View, Calif.

Uniform resource locators (URLs) provide a coherent method of uniquely identifying resources on the Internet, such as HTML pages and other resources. A URL uniquely specifies the location of a resource on the Internet by identifying the type of server making the object available (e.g., www, ftp, Gopher, and the like), the address of the resource and, if necessary, the path name or identifier of the resource or object within the server providing the resource. Essentially, any object that a server wishes to make available may be defined in terms of a respective URL.

Browser programs and other programs may be used to store logical addresses of HTML pages (and other resources) within data structures commonly known as bookmarks. Bookmarks typically comprise a list of uniform resource locators (URLs) which uniquely specify the location of a resource such as an HTML page. Unfortunately, some URLs may not be effectively bookmarked. For example, web pages generated using a common gateway interface (CGI) typically cannot be bookmarked, though the base entry page of a CGI-generated web page may be bookmarked. It is also difficult to bookmark framed web pages.

Increasingly, servers are providing non-static web pages to clients accessing the information servers using, for example, browsers. That is, the web pages received by a client's browser are often generated in response to the client's request for such a web page. The web page provided to the client is not associated with a URL. Rather, the web page provided to the client is simply an HTML object instantiated for use by the browser to convey information to the client. Such an instantiated object is typically impossible to bookmark, since there is no static URL associated with the object, i.e., the object (doesn't yet exist). The instantiated object is provided by the information server in response to user interaction with the information server. Thus, to retrieve the same object, the client must interact with the server in the same manner to cause the information server to instantiate the same object.

Therefore, a need exists in the art for a method, an article of manufacture, a system and a data structure enabling the "bookmarking" or resolving of CGI pages, frames and other objects typically considered non-resolvable using standard URLs.

SUMMARY OF THE INVENTION

The invention provides a method, an article of manufacture, a system and a data structure providing a chained or compound URL including a base URL and all subsequent navigation steps necessary to access a desired resource such as a responsively instantiated resource or framed resource. That is, in the case of a resource that is only instantiated after a plurality of user interactions with a resolvable or addressable resource (such as a base web page), a chained or compound URL according to one embodiment includes indicia of the interactions required to cause the desired resource or object to be instantiated. Another embodiment comprises a browser that is capable of storing and using such a multiple part URL as a bookmark. The invention also comprises a navigation method in which a web retrieval indicator determines which part within the multiple part URL should be executed next.

Specifically, a data structure according to one embodiment comprises: a base URL field, for identifying a base URL; and a selection field, for storing at least one navigation selection; the at least one navigation selection operable to modify a resource associated with the base URL, the base URL and the at least one navigation selection forming a sequence of navigation selections.

BRIEF DESCRIPTION OF THE DRAWINGS

A more particular description of embodiments of the invention, briefly summarized above, may be had by reference to the illustrations in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the FIGS.

DETAILED DESCRIPTION OF THE PREFERRED EMBODIMENT

Figure 1:
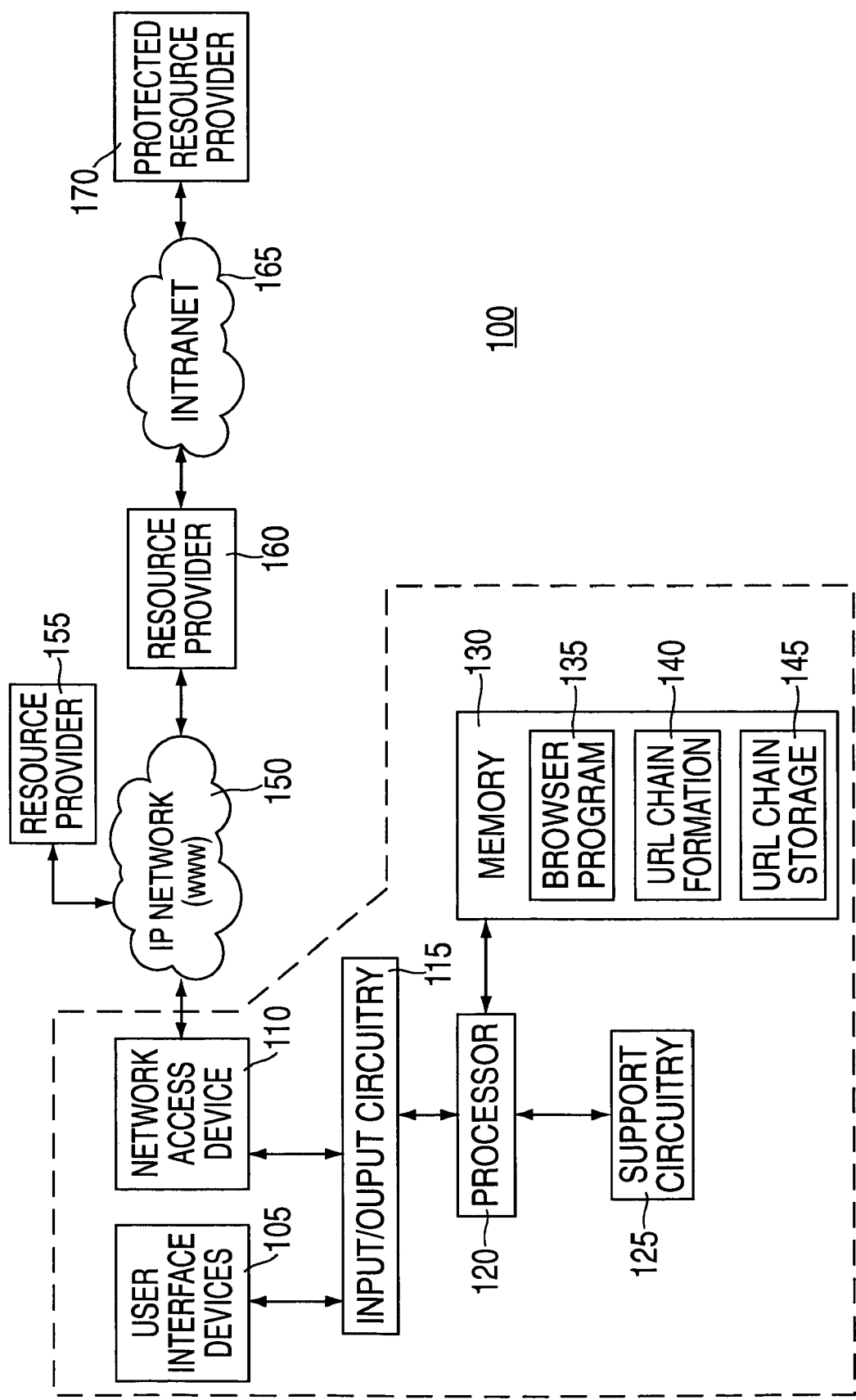
FIG. 1 depicts a simplified block diagram of a communications system that benefits from the present invention.

FIG. 1 depicts a simplified block diagram of a communications system that benefits from the present invention. Specifically, FIG. 1 depicts a simplified block diagram of a user terminal 101 communicating with a plurality of resource providers 155, 160 via a network 150, illustratively an Internet protocol (IP) network. Optionally, one of the resource providers (illustratively resource provider 160) communicates with a protected resource provider 170 via an internal network 165 within a company or organization. The protected resource provider 170 is separated from the IP network 150 via a fire wall (not shown) within the resource provider 160.

The resource providers 155, 160 and protected resource providers 170 comprise any server capable of delivering an object or other resource to the user terminal via the network 150 (or network 165). Thus, it will be noted that in the case of a user wishing to access information from the protected resource provider 170 via the unprotected resource provider 160, the chained network address or URL of an embodiment of the invention may include password entry and/or other steps necessary to navigate the boundaries established by the fire wall.

In one embodiment, it is noted that the chained network address or URL includes the ability to pause the execution of stored selections and ask the user for a specific password or other security entry. In this manner, some user input may be required to access a protected resource (even a resource that has been accessed previously to form a chained URL), though the majority of the interactions necessary to access that resource are automated by the chained URL.

The user terminal 101 is depicted as a general purpose computer comprising a processor 120, input/output (I/O) circuitry 115, support circuitry 125, memory 130, user interface devices 105 and a network access device 110. The user interface devices 105 comprise a display screen, a keyboard, a mouse, a track ball and/or other user interface devices commonly known to those skilled in the art. The user interface devices 105 are coupled to the processor 120 via the I/O circuitry 115. Similarly, the network access device 110 is coupled to the processor 120 by the I/O circuitry 115. The network access device 110 may comprise any network access device, such as a modem or other network device suitable for transmitting and receiving data via the network 150. The memory 130 may be a solid state memory, a disk drive, an optical memory, a removable memory device, or a combination of any of these memory devices. The support circuitry 125 comprises such well known support components as cache memory, power supplies, clock circuits and the like. The combination of all these components and elements forms a general purpose computer that, when executing a particular software package or routine, becomes a special purpose computer. In this case, the processor 120 when executing a browser program 135, URL chain formation program 140 or URL chain storage program 145 becomes a special purpose computer adapted to the relevant program or function.

It will be appreciated by those skilled in the art that one embodiment is implemented as a program product for use with a computer system such as, for example, the system 100 shown in FIG. 1. The program (S) of the program product defines functions of the preferred embodiment and can be contained on a variety of signal bearing media, which include, but are not limited to, (i) information permanently stored on non-writable storage media (e.g., read only memory devices within a computer such as CDROM disks readable by a CD-ROM drive); (ii) alterable information stored on writable storage media such as floppy disks within a diskette drive or hard disk drive; or (iii) information conveyed to a computer by a communications medium, such as semiconductor memory or through a computer or telephone network including wireless communications. Such signal-bearing media, when carrying the computer-readable instructions that direct the functions of the present invention, represent embodiments of the present invention.

Figure 2:
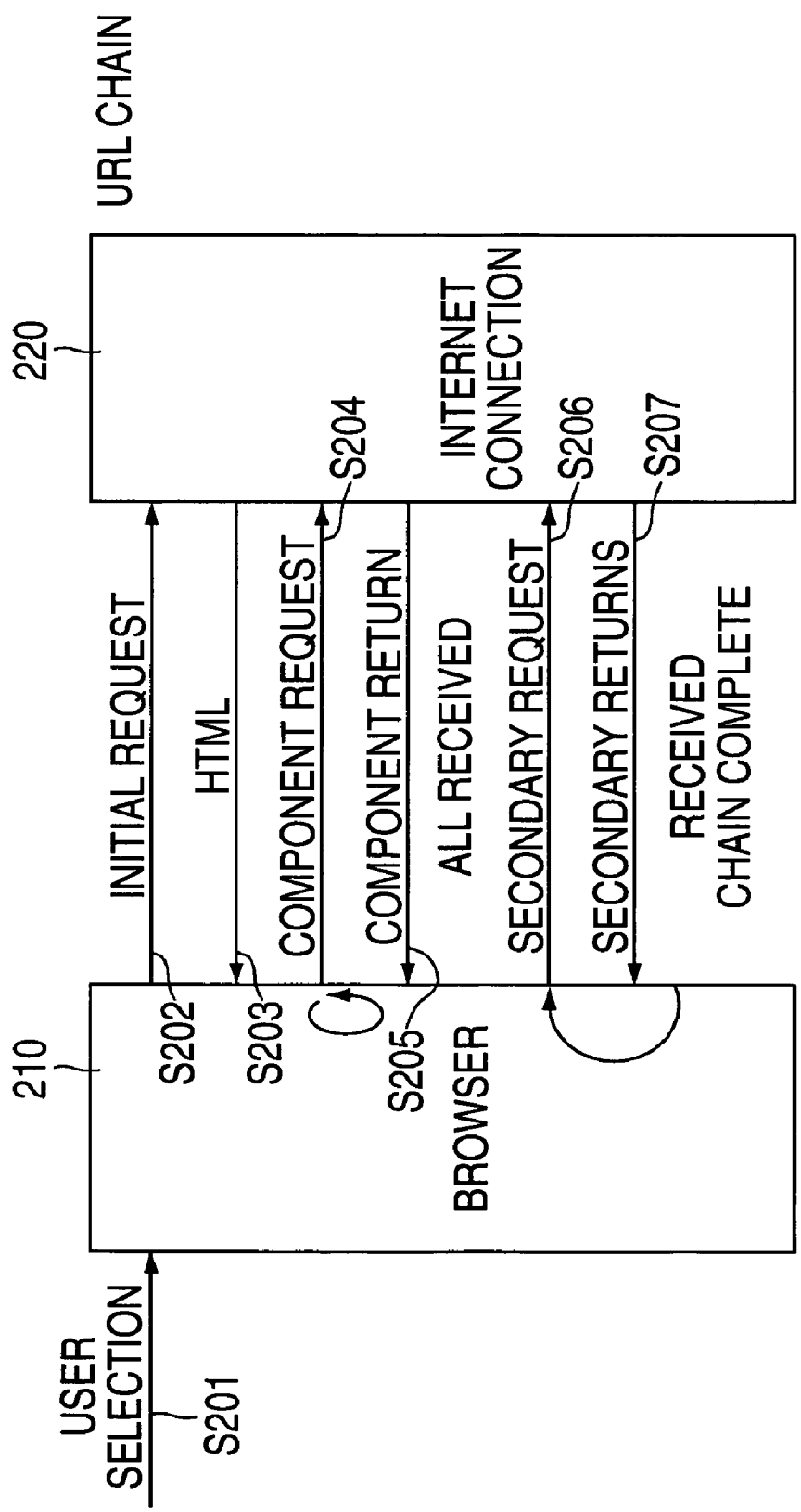
FIG. 2 depicts a high level representation of URL usage according to an embodiment of the present invention.

FIG. 2 depicts a high level representation of uniform resource locator (URL) usage in which a network address or uniform resource locator chain according to an embodiment of the present invention is utilized. An example of such signal bearing media is represented in FIG. 1 as memory 130. Specifically, FIG. 2 depicts an interaction diagram illustrating interaction between a browser 210 and an information server or other information source represented as an Internet connection 220.

In response to a user selection at a step S201 by a user interacting with the browser 210, an initial request is propagated at step S202 to the Internet connection 220. The initial request comprises at least a base portion of a URL chain. The server (not shown) accessed via the base portion of the URL chain provided in the initial request S202 returns the HTML page associated with the base portion of the URL chain to the browser 210. The browser 210 then transmits a component request S204 to the server via the Internet connection 220. The information components are processed by a server providing the requested resource and any resulting information is provided to the browser 210 via step S205. It is noted that the component request propagated through the Internet connection 220 at step S204 comprises a non-base portion of the URL chain.

After all the components requested at step S204 are received via step S205, any secondary component requests within the URL chain are transmitted to the information server at step S206 via the Internet connection 220. The secondary information requests are processed by the server providing the requested resource and any resulting information is provided to the browser 210 via step 207. Steps S206 and S207 are repeated for each secondary information request included with the URL chain. In this manner, a user may select a single bookmark associated with a URL chain to effect a complex sequence of interactions with a server for the purpose of retrieving a resource that may not be resolvable using a standard URL. It should be noted that steps 206 and 207 may encompass multiple component requests such as discussed above with respect to steps 204 and 205.

A URL chain comprises a base portion followed by one or more component portions, where each component portion represents an address, object(s) manipulation(s), pointer or alphanumeric data and the like. Thus, each component of a URL chain represents a user manipulation or selection suitable for accessing a next portion of a web page or other object associated with the URL chain or compound URL. An executed selection comprises a user manipulation or selection that is forwarded to the server for processing or processed locally by an applet or other structure within the base URL object. By segmenting a sequence of user commands into a base URL and one or more executable selections, a chained URL is formed.

Figure 3A:
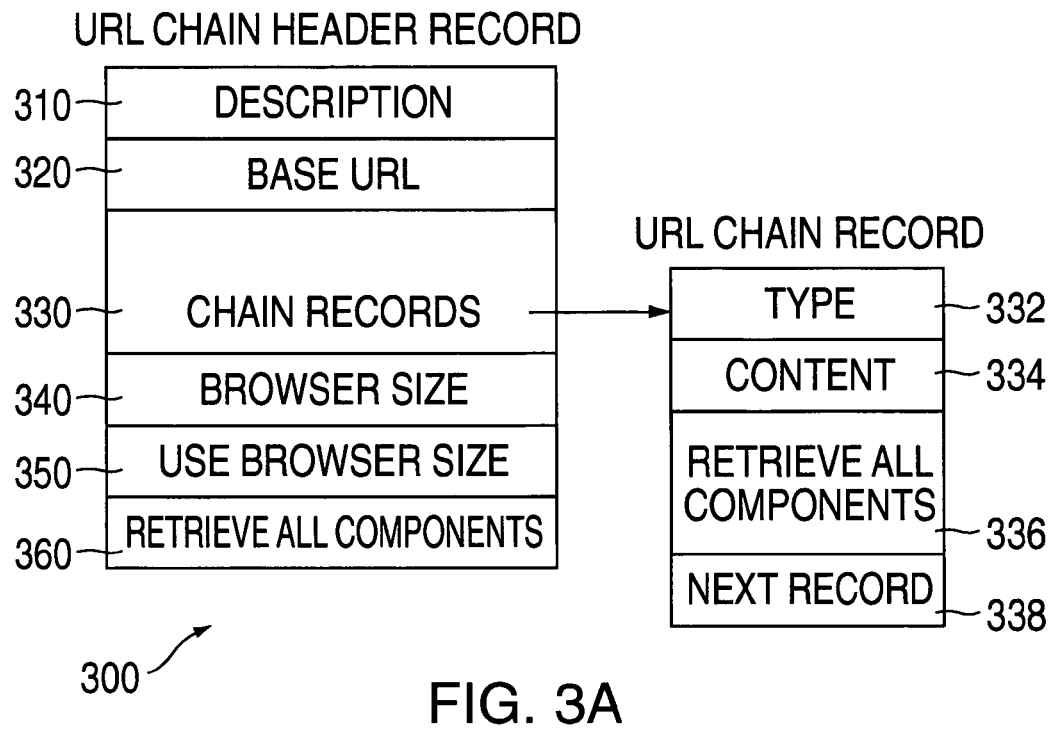
FIG. 3 depicts various data structures according to embodiments of the present invention.

FIG. 3A depicts a data structure according to an embodiment of the present invention. Specifically, FIG. 3A depicts a URL chain header record 300 comprising a description field 310, a base URL 320, one or more URL chain records 330, a browser size field 340, a use browser size field 350 and a retrieve all components field 360.

The description field 310 comprises text describing the URL chain or some aspect thereof. The description may be provided by a user, be a default description based on, for example, text within a base URL or other text. This field is useful in identifying, in a manner beneficial to the user, the purpose or intended resolved resource of the chained URL. The base URL 320 comprises the base URL of the URL chain. The browser size field 340 stores data indicative of the size of a browser window suitable for displaying the resource resolved by the base URL. The use browser size field 350 stores a flag indicative of whether the data in the browser size field 350 should be used to size a browser window or frame. The retrieve all components field 360 stores a flag indicative of whether all components within the chain records 330 should be retrieved to resolve the desired resource before processing subsequent portions of the URL chain.

Each URL chain has an initial URL, and one or more secondary actions, values, and/or sub-URLs which, when executed in the appropriate sequence after the initial URL, allow a browser to cause the instantiation or otherwise resolve the address of a desired resource. That is, each URL chain includes an executable selection that may be executed within the context of a URL or sub-URL.

There are several types of chain data used in the chained URL. A first step of a URL chain comprises a base URL, which is the visual URL or, simply, the URL seen in an address window of a browser. A second type of chain data comprises line data, which includes requests for resources via HTTP and other mechanisms. A third type of chain data comprises mouse and keyboard data, which comprises data entered via a keyboard or a mouse. It is contemplated by the inventors that, after an initial or base URL is resolved, a "chain" of data comprising other URLs, line data and/or mouse and keyboard data may be used to access the intended resource or object associated with the URL chain.

Each chain record stored within the chain records field 330 comprises a type field 332, a content field 334, a retrieve all components field 336 and a next record field 338. The type field 332 stores information indicative of the type of record included within the content field 334. As previously noted, the types of chain data comprise URLs, line data, mouse data or keyboard data. The content field 334 includes the URL, line data, mouse data or keyboard data associated with the respective chain record. The retrieve all components field 336 stores a flag indicative of whether all components within the chain records 330 should be retrieved to resolve the desired resource. The next record field 338 stores a pointer to the next URL chain record within the chain records field 330 to be accessed. In this manner, the URL chain records stored within the chain records field 330 comprise a linked list of chain records. This linked list of records is iteratively processed by, for example, a chained-URL enabled browser until a desired resource is resolved.

Figure 3B:
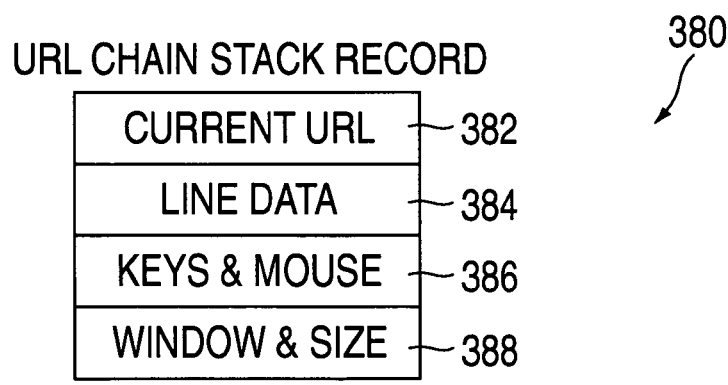

FIG. 3B depicts a data structure according to an embodiment of the present invention. Specifically, FIG. 3B depicts a network address or URL chain stack record suitable for use in tracking user interactions such that the user interactions may be captured and formed into a URL chain. The URL chain stack record data structure 380 of FIG. 3B comprises a current URL field 382, a line data field 384, a keys and mouse field 386, and a window and size field 388. The current URL field indicates the uniform resource locator, for example, of the HTML page presently loaded into the user's browser. The line data input provided by the user while the current URL resource is active (i.e., the URL identified within the current URL field 382). The keys and mouse field 386 includes any keyboard or mouse entries provided by the user line data input provided by the user while the current URL resource is active (i.e., the URL identified within the current URL field 382). The window and size field 388 indicates the appropriate size of the window or frame used to display the HTML page or other resource identified by the URL within the current URL field 382.

Thus, the data structures described above with respect to FIGS. 3A and 3B provide for the tracking of user interactions (the URL chain stack record 380 of FIG. 3B) and the use of such tracking to provide URL chains (URL chain 300 of FIG. 3A) suitable for use in retrieving or resolving resources. That is, in the case of a user interacting with a plurality of framed, generated or other instantiated objects to retrieve or resolve a desired resource, all user interactions necessary to retrieve or resolve the desired resources are stored within a plurality of URL chain stack records during the initial user interaction. The URL chain stack records are then processed to form a sequence of chain records to be stored in the chain records field 330 of the URL chained header record 300 of FIG. 3A. In this manner, the necessary user interactions become automated such that a bookmark associated with the URL chain header record will, when selected by the user, perform all the steps necessary to retrieve or resolve the desired resource.

Figure 4:
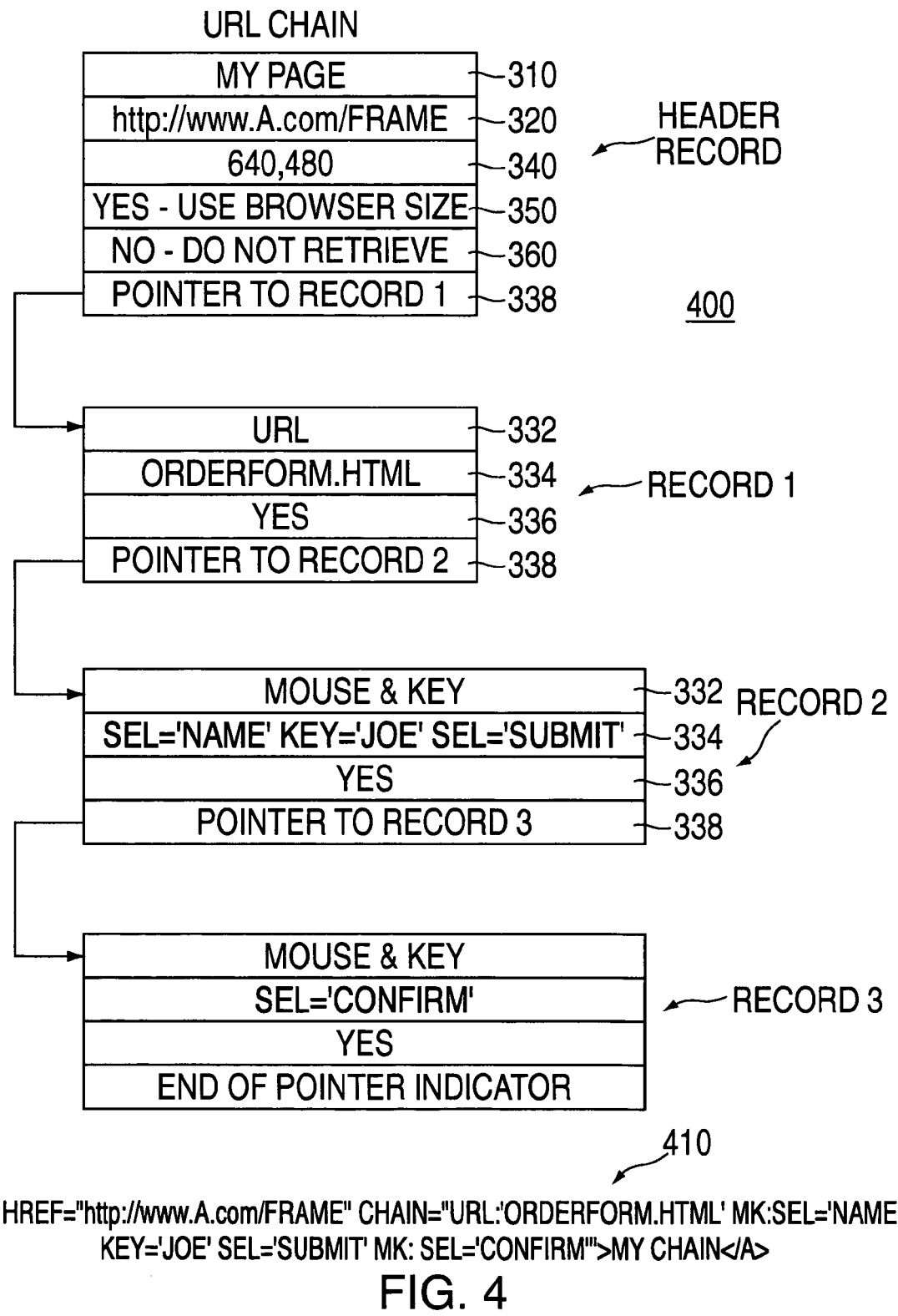
FIG. 4 depicts an exemplary URL chain.

An example of the use of the data structures of FIGS. 3A and 3B will now be described with respect to FIG. 4. It will be noted that the reference designators shared between FIGS. 4, 3A and 3B will be similarly used where possible. Specifically, FIG. 4 depicts an exemplary network address or URL chain comprising a header record and three URL chain stack records denoted as record 1, record 2 and record 3. The Header Record and other Records are formed according to the data structures discussed above with respect to FIG. 3.

Referring now to the URL chain record denoted as Header Record, the description field 310 of the Header Record describes the URL chain as "My Page." The base URL field 320 of the header record shows the base URL as "HTTP:/www.a.com/frame." The browser size field 340 shows that the browser window is 640 pixels×480 pixels in size. The use browser size field 350 indicates that the 640×480 window is to be used. The retrieve all components field 360 indicates that all of the components are not to be retrieved. The next record field 338 points to Record 1.

Referring now to the URL chain record denoted as Record 1, the type field 332 indicates that the record is a URL type (e.g., a base HTML page). The content field 334 indicates that the particular URL is "order form.HTML." The retrieve all components field 336 indicates that all components associated with manipulation of the URL within context field 334 should be retrieved. The next record field 338 includes a pointer to Record 2.

Referring now to the URL chain record denoted as Record 2. The type field 332 indicates that Record 2 is a mouse and key type of record. The content field 334 indicates that several variables and/or actions are to be associated with particular text entries. Specifically, a "name" button has been selected; the word "Joe" has been keyed in; and a "SUBMIT" or "ENTER" button has been selected. The retrieve all components field 336 indicates that all components are to be retrieved. The next record field 338 points to Record 3.

Referring to the URL chain record denoted as record 3, the type field 332 indicates that record 3 is a mouse or key type of record. The content field 334 indicates that a "CONFIRM" button has been selected. The retrieve all components field 336 indicates that all components should be retrieved; and the next record field 338 includes an end of pointer or end of record indicator. The end of pointer indicator indicates that Record 3 is the last record within the URL chain 400.

It is noted that in the exemplary embodiment of the present invention, the term SEL comprises a selection of a field (using a mouse or other pointing device) associated with a button, such as in a dialog box displayed on the user's display device. Similarly the term KEY indicates a text entry into, for example, a text field of dialog box. Thus, as noted above with respect to Record 2, a user has selected a particular dialog box (i.e., the "NAME" dialog box), entered some text into that dialog box (i.e., "Joe") and finally selected, using a mouse or other pointing device, a "SUBMIT" button associated with the dialog box. In this manner, a chained URL mimics the actual user steps necessary to effect a desired result, irrespective of the particular graphical user interface presented to the user.

A textual representation of the URL chain 400 is shown in FIG. 4 as chain or compound URL 410. Specifically, chain or compound URL 410 comprises a HTML code snippet that reads as follows:

<A HREF="http://www.a.com/frame"CHAIN="URL'ORDERFORM.HTML' MK:SEL='NAME' KEY='JOE' SEL='SUBMIT' MK: SEL='CONFIRM'">MY CHAIN</A>.

It is noted that the exemplary data structure 400 described above with respect to FIG. 4 may be converted into the textual representation shown with respect to item 410. Similarly, item 410 may be parsed to retrieve information sufficient to recreate the data structure 400. Advantageously, the above-described data structure will be interpreted by present browser programs to successfully resolve the first URL within a URL chain, while ignoring the remaining "chained" portion of the URL chain. That is, the above-described data structure provides backward compatibility with browsers that are not enabled to process chained URL structures, as described herein.

Figure 5A:
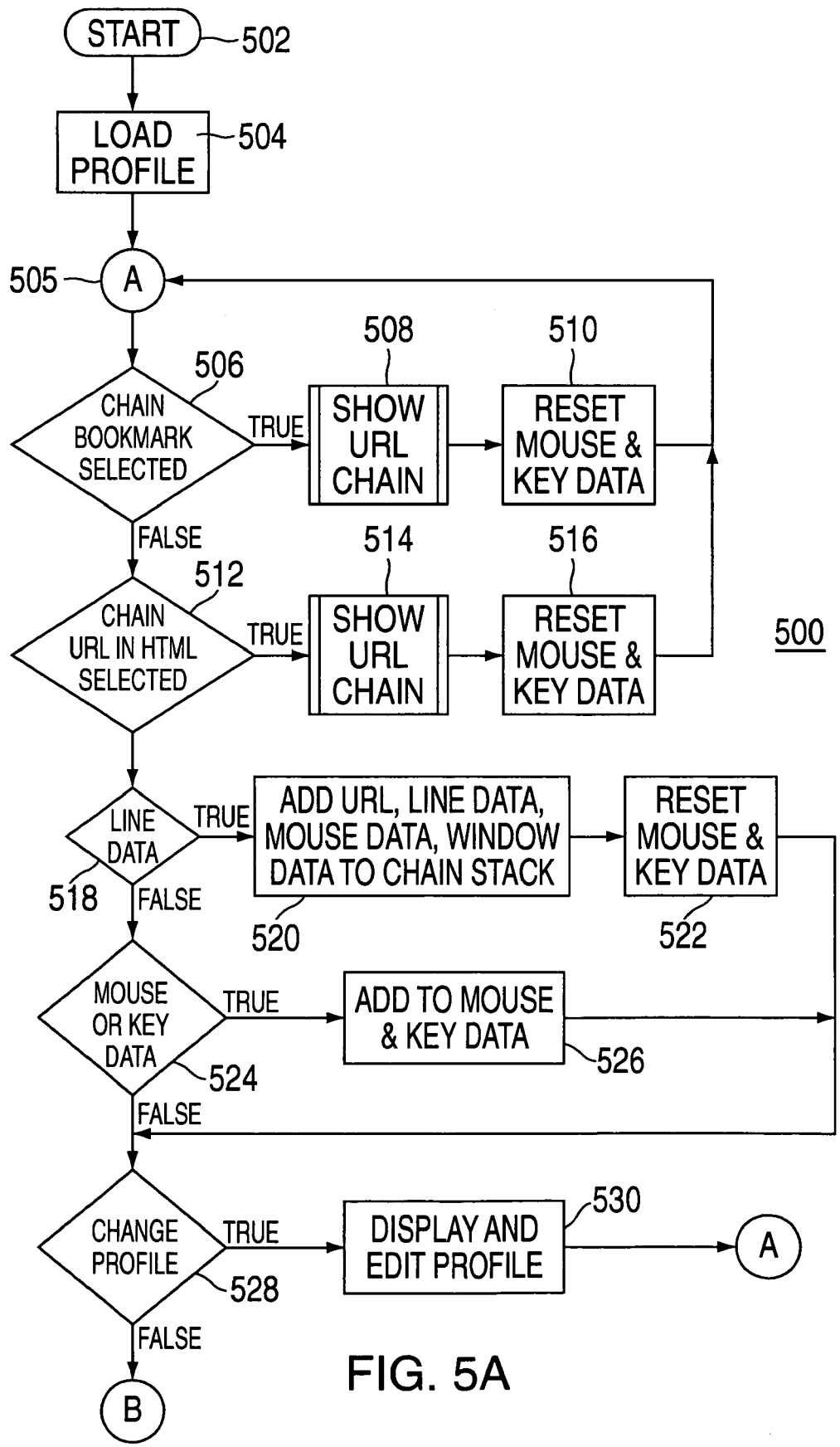
FIG. 5 depicts a flow diagram of a bookmark processing method.
Figure 5B:
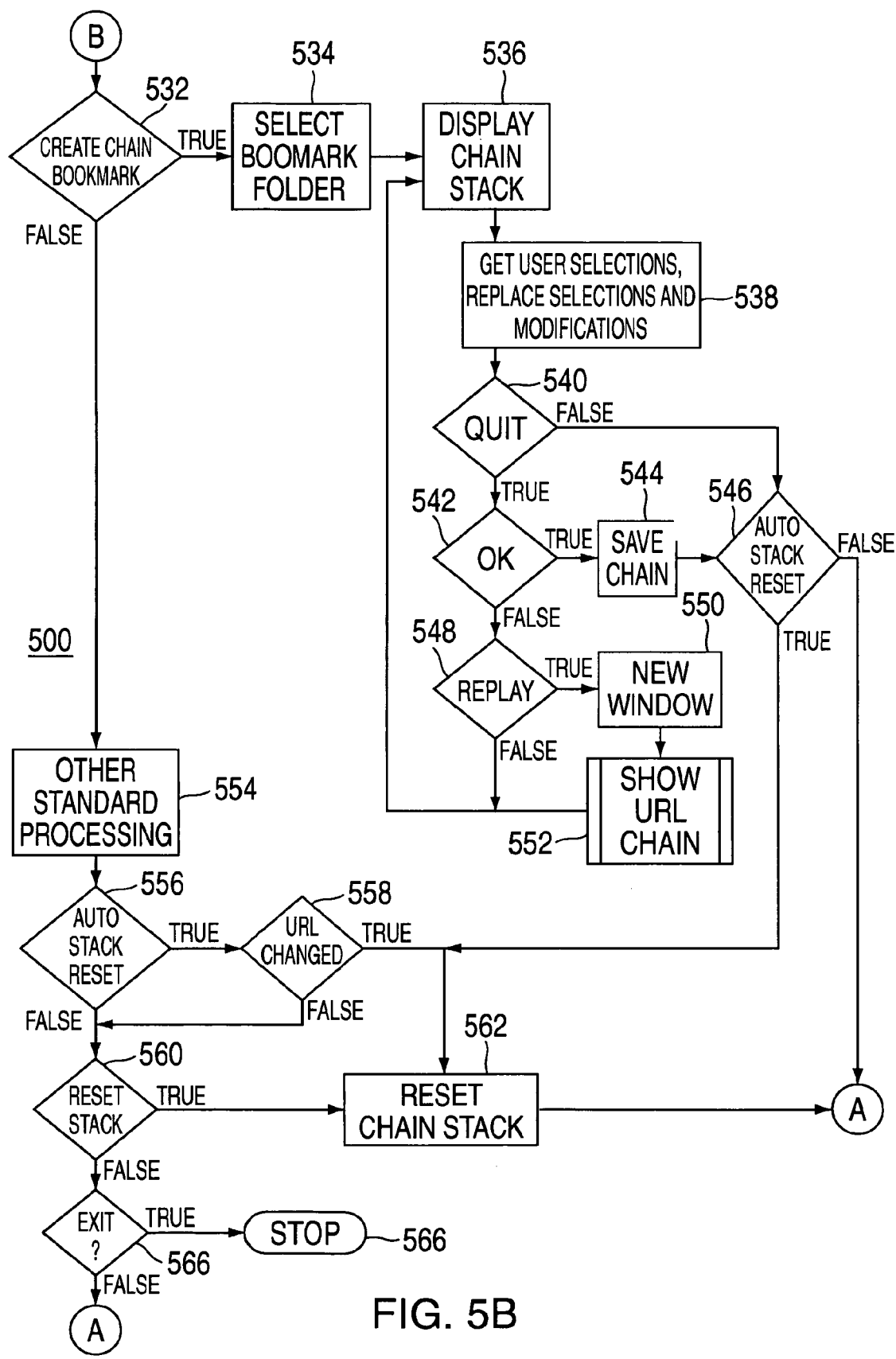

FIG. 5 depicts a flow diagram of a bookmark processing method. Specifically, FIGS. 5A and 5B together depict a method 500 for bookmark processing.

The method 500 of FIG. 5 is entered at step 502 and proceeds to step 504, where a profile is loaded. The method 500 then proceeds to step 506.

The profile comprises a set of user preferences that are typically stored on a mass storage device associated with the user's computing device. While many user preferences may be defined, an important user preference comprises the auto stack reset preference. The auto stack reset preference is used during the formation of a chained stack that ultimately results in a chained URL or chained bookmark. Within the context of the chained URLs, it is desirable to begin at a known accessible or resolvable URL, and then progress to less accessible or non-resolvable URLs. For example, automatic predictions may be made during the course of user navigation resulting in the construction of a stack. Such predictions are inherently imperfect, since many visible and non-visible processes associated with a presently retrieved resource may be performing functions relevant to the retrieval of subsequent resources, though not apparent to the user and/or the user's browser. The automatic stack reset, if set within the user profile, will try and predict the times that the stack should be reset, such that a new, known accessible URL may be inserted as the base URL to a URL chain. In this manner, lengthy strings of base and non-base URLs may be avoided by keeping only a single base URL and any non-base URLs subsequent to the base URL within the URL chain. Other user profile information comprises preferred colors, fonts and the like well known to those skilled in the relevant art.

At step 506 a query is made as to whether a URL-chain bookmark has been selected by a user. If the query at step 506 is answered negatively, then the method 500 proceeds to step 512. If the query at step 506 is answered affirmatively, then the method 500 proceeds to step 508 where the URL chain is displayed to the user and to step 510 where mouse and key entry data associated with the URL chain are reset. The method 500 then proceeds to step 505 to await user input.

At step 512, a query is made as to whether a chained URL in a displayed HTML page has been selected. If the query is answered negatively, then the method 500 proceeds to step 518. If the query is answered positively, then the method 500 proceeds to step 514, where the URL chain is displayed for the user, and to step 516 where the mouse and key entry data associated with the URL chain are reset. The method 500 then proceeds to step 505 to await user input.

At step 518 a query is made as to whether line data has been transmitted. That is, at step 518 a query is made as to whether information has been transmitted to the network, such as user entered text, data manipulations or other user generated or resource generated information transmitted back to the network. That is, a determination is made as to whether the user has done anything that results in information being sent from the client back to the server. The information may comprise an applet response, pointing device motion, key pad entry and the like. If the query at step 518 is answered negatively, then the method 500 proceeds to step 524. If the query at step 518 is answered positively, then the method 500 proceeds to step 520, where the URL, line data, mouse data and/or window data are added to the URL chain stack being formed. As previously noted, the URL chain stack comprises a list of each URL and any associated line data entry, text data entry, mouse data entry and window data entry, in an appropriate sequence, such that a dynamic or virtual object represented by an instantiated or framed URL may be accessed at a later date. The method 500 then proceeds to step 522, where the mouse and key entry data are reset, and to step 528.

At step 524, a query is made as to whether mouse or keyboard data has been entered by the user. If the query at step 524 is answered negatively, then the method 500 proceeds to step 528. If the query at step 524 is answered positively, then the method 500 proceeds to step 526 where the mouse or keyboard data entered by the user is added to the mouse and keyboard data of the URL chain stack being formed. The method 500 then proceeds to step 528.

At step 528, a query is made as to whether a profile change is desired. For example, does the user wish to edit his bookmarks or change the auto stack reset option. If the query at step 528 is answered negatively, then the method 500 proceeds to step 532. If the query at step 528 is answered positively, then the method 500 proceeds to step 530, where the profile is displayed such that the user may edit the profile. The method 500 then proceeds to step 505 to await further user input.

At step 532, a query is made as to whether a chain bookmark should be created. If the query at step 532 is answered negatively, then the method 500 proceeds to step 554. Otherwise, the method 500 proceeds to step 534, where the bookmark folder is selected, and to step 536 where the URL chain stack is displayed for the user. The URL chain stack comprises one or more chain stack records (such as discussed above with respect to chain stack record 380 of FIG. 3B) that have been formed by successive execution of steps 520 and 526. The method 500 then proceeds to step 538.

At step 538, the user makes selections of the chain and then the selections and modifications are replayed. That is, at step 538 the selections and modifications made by the user to effect the retrieval of the desired object are retrieved. These selections and modifications have been stored as one or more chain stack records. The method 500 then proceeds to step 540.

In one embodiment, the user may indicate a preference for URL line or mouse and key processing for replay purposes. That is, the URL chain stack includes both the line and mouse/keystroke entries used to effect each portion of the URL chain, such that each new step in the process may be replicated using either method. Optionally, the user selects which data entry method is most appropriate or otherwise "best" to effect a respective portion of the URL chain. The user may manually make the selection and thereby modify the URL chain as it is being formed or subsequent to the formation.

At step 540, a query is made as to whether the user wants to quit the chain bookmark creation process. If the query at step 540 is answered affirmatively, then the method 500 proceeds to step 542. If the query at step 540 is answered negatively, then the method 500 proceeds to step 546.

At step 542, a query is made as to whether the created bookmark chain is acceptable to the user. If the query at step 542 is answered affirmatively, then the method proceeds to step 544 where the created chained bookmark is saved, and to step 546. If the query at step 542 is answered negatively, then the method 500 proceeds to step 548.

At step 546, a determination is made as to whether an automatic stack reset should be performed. That is, at step 546, a determination is made as to whether the URL chain stack should be reset. If the query at step 546 is answered affirmatively, then the method 500 proceeds to step 562. If the query at step 546 is answered negatively, then the method 500 proceeds to step 505 to await further input.

At step 548, a query is made as to whether the user would like to replay the created chained bookmark. If the query at step 548 is answered negatively, then the method 500 proceeds to step 536 where the created chained stack is displayed. If the query at step 548 is answered affirmatively, then the method 500 proceeds to step 550 where a new window is opened, and to step 552 where the URL chain is displayed within the new window. The method 500 then proceeds to step 536, where the URL chain stack is displayed.

At step 554, other standard processing functions are performed. That is, at step 554, processing functions other than those described above with respect to steps 534 through 552 are performed. For example, a non-chained or regular URL is selected by the user, a user profile is changed, and the like. The method 500 then proceeds to step 556.

At step 556, a query is made as to whether an automatic stack reset should be performed. If the query at step 556 is answered negatively, then the method 500 proceeds to step 560. If the query at step 556 is answered affirmatively, then the method 500 proceeds to step 558, where a determination is made as to whether the URL has changed. If the query at step 558 is answered negatively, then the method 500 proceeds to step 560. If the query at step 558 is answered affirmatively, then the method 500 proceeds to step 562.

At step 560, a determination is made as to whether the chain stack should be reset. If the query at step 560 is answered negatively, then the method 500 proceeds to step 564. If the query at step 560 is answered affirmatively, then the method 500 proceeds to step 562.

At step 562, the chain stack is reset, and the method 500 proceeds to step 505 to wait for the next user input. That is, the chain stack records used to store the various user interactions necessary to resolve the desired URL are cleared.

At step 564, a query is made as to whether the method should be exited. If the query at step 564 is answered affirmatively, then the method proceeds to step 566 where it is exited. Otherwise, the method proceeds to step 505 to wait for the next user input.

Figure 6:
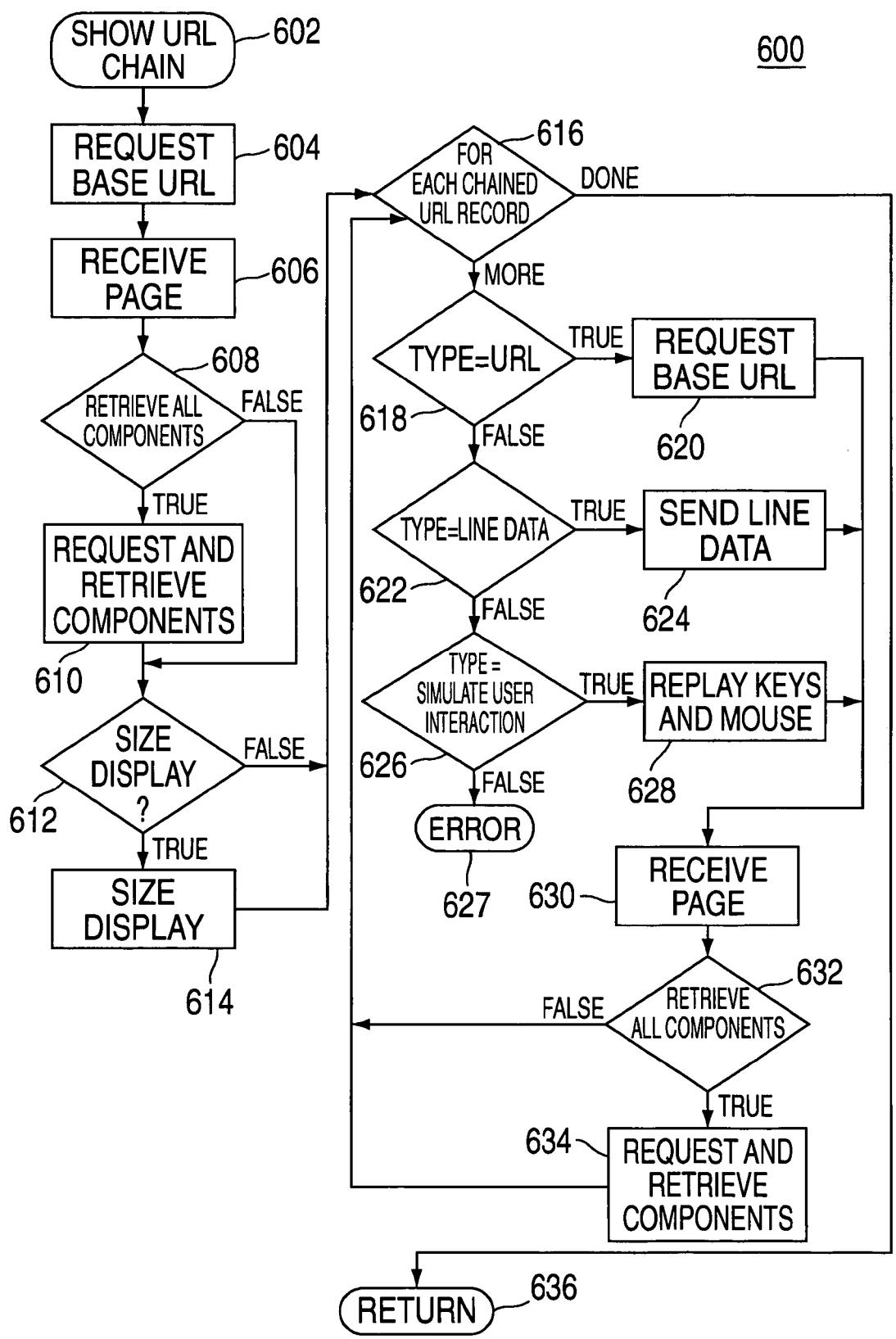
FIG. 6 depicts a flow diagram of a URL chain processing method suitable for use in the bookmarking method of FIG. 5.

FIG. 6 depicts a flow diagram of a URL chain processing method suitable for use in the bookmarking method of FIG. 5. Specifically, FIG. 6 depicts a flow diagram of a method 600 suitable for implementing steps 508, 514 and 552 of the method 500 of FIG. 5.

The method 600 of FIG. 6 is entered at step 602, where the presently active URL chain is displayed, and proceeds to step 604.

At step 604 the base URL of the displayed URL chain is requested from, for example, an appropriate server via the Internet. The method 600 then proceeds to step 606, where the HTML page or other object associated with the base URL is received. The method 600 then proceeds to step 608.

At step 608, a query is made as to whether all components should be retrieved. That is, at step 608 the retrieve all components field 360 of the URL chain header record 300 of the presently displayed URL chain is examined to determine if the flag or other indicium indicates that all components should be retrieved. If the query at step 608 is answered negatively, then the method 600 proceeds to step 612. If the query at step 608 is answered positively, then the method 600 proceeds to step 610, where the various components are iteratively requested and retrieved from the server. After the last component has been retrieved, the method 600 proceeds to step 612.

At step 612, a query is made as to whether the display should be sized. That is, at step 612 a determination is made as to whether the use browser size field 350 of the URL chain header record 300 includes a flag or other indicia suggesting that a browser window or frame should be horizontally and/or vertically sized to accommodate the base URL object or objects. If the query at step 612 is answered negatively, then the method 600 proceeds to step 616. If the query at step 612 is answered affirmatively, then the method 600 proceeds to step 614 where the browser size field 340 of the URL chain header record 300 is examined to determine the appropriate window or frame size for the base URL object. The method 600 then proceeds to step 616.

In one embodiment, the actual pixel position of an icon representing a pointing device placement is used in calculating the data to send to a server as part of a chained URL. Thus, since HTML pages may be resized, potentially resulting in a resizing of imagery within the HTML page, the actual pixel position may change along with the size of the HTML page. To ensure that the pixel position of the mouse is an accurate representation of the user selection, the size of the HTML page is used to recreate the exact dimensions of the imagery contained therein, thereby assuring substantially identical selections within the context of the chained URL. One example of such imagery is banner advertisements within an HTML page, where different portions of the banner advertising result in different links. By insuring that the HTML page size is appropriate (with respect to the selections made by the user), pixel coordinates associated with the selected portion of the banner advertisement are accurately recreated and transmitted to a server, resulting in consistent operation.

In one embodiment, all selections are made with respect to X and Y coordinates of a mouse or other pointer to a graphic object, whereby adjusting the size of the window adjusts the graphic object. In this case, the size parameters are used to size the window appropriately such that the subsequent selection of that graphic object results in the same result. Similarly, in the case of text entry fields and other objects manipulated within an HTML page or other resource, positional coordinates may be used to insure consistency between user selection of the objects and subsequent reproduction of the user selection via a chained URL.

At step 616, a query is made as to whether each URL chain record within the chain records field 330 of the URL chain header record 300 has been processed. If each chain record has been processed, then the method 600 proceeds to step 636 where it is exited. If additional chain records are to be processed, then the method 600 proceeds to step 618. At step 618, a query is made as to whether the type of chain record to be processed comprises a URL type. That is, at step 618 the type field 332 of the URL chain record being processed is examined to determine if the URL chain record comprises a URL type. If the query at step 618 is answered negatively, then the method 600 proceeds to step 622. If the query at step 618 is answered affirmatively, then the method 600 proceeds to step 620, where the base URL of the chain record is requested from, for example, a server including the resource identified by the base URL. The method 600 then proceeds to step 630.

At step 622, a query is made as to whether the URL chain record type field 332 indicates that the URL chain record being processed includes line data. If the query at step 622 is answered negatively, then the method 600 proceeds to step 626. If the query at step 622 is answered affirmatively, then the method 600 proceeds to step 624 where the line data included within the content field 334 is transmitted to the server. The method 600 then proceeds to step 630.

At step 626, a query is made as to whether the URL chain record type comprises simulated user interaction. That is, at step 626 a query is made as to whether the content field 334 of the URL chain record being processed includes keyboard entry data, mouse data or other user interaction data. If the query at step 626 is answered negatively, then the method 600 proceeds to step 627 where an error handler is invoked. The error handler responds to the error of the type field failing to include a valid type (i.e., URL, line data or user interaction data). The error handler then returns the method to step 636 where it is exited. If the query at step 626 is answered affirmatively, then the method 600 proceeds to step 628 where the user interaction data, such as keyboard entry or mouse data, is "replayed" or otherwise provided to the server in a manner adapted to mimic user input of that same data to the base URL object previously displayed. The method 600 then proceeds to step 630.

At step 630 an HTML page or other object is received from the server. The HTML page or other object is typically transmitted by the server in response to a request for URL, (e.g., step 620), the transmission of line data (e.g., step 624) or the transmission of simulated user interaction data (e.g. step 628). After receiving the HTML page or other object from the server, the method 600 proceeds to step 632.

At step 632, a query is made as to whether all components are to be retrieved. That is, at step 632 the retrieve all components field 336 of the URL chain record being processed is examined to determine if all components are to be retrieved. If the query at step 632 is answered negatively, then the method 600 proceeds to step 616. If the query at step 632 is answered affirmatively, then the method 600 proceeds to step 634, where the method iteratively requests and retrieves all components associated with the URL chain record being processed. The method 600 then proceeds to step 616, to determine if additional chained URL records are to be processed.

The above-described embodiments advantageously provide for the creation and use of chain or compound URLs. These chain or compound URLs utilize, for example, the data structures depicted above with respect to FIGS. 3 and 4. It will be appreciated by those skilled in the art that the actual data structure embodiments used to implement the teachings of the present invention may be modified while remaining within the scope of the invention. Moreover, the methods of FIGS. 5 and 6 may also be modified while remaining within the scope of the present invention. The chain or compound data structures, and methods of forming utilizing such data structures, advantageously provide for the resolving of URLs that previously could not be resolved within the context of a bookmarked environment (or, as in the case of framed windows, could not be reproduced to provide associated frames previously displayed within the same browser image).

The above-described embodiment provides URL chain segments having a fully formed URL, a URL fragment and/or user input (e.g., mouse or keyboard entry data) within a displayed web page. A browser that is URL chain enabled may, in one embodiment, automatically detect that a navigation chain is in process and responsively capture the various input sequences used to generate the navigation chain.

Advantageously, the above methods provide a browser program capability that enables a user to view the sequence of navigation steps within a chained URL as the steps are executed. The user may optionally pause each step for confirmation (not shown) prior to the execution of the step. That is, given a chained URL having a base URL and illustratively four sub-URLs or other navigation steps or executable selections, the user may confirm that the sub-URLs or other navigation steps or executable selections are to be executed. In this manner, a user may modify the chained URL as it is being executed. Such modifications to the chained URL may be saved. That is, a bookmark chained URL that is modified during execution by a user is itself modified to reflect the user modifications. Thus, the various portions of the chain are iteratively processed, subject to user confirmation, until the entire chain has been processed.

In one embodiment, a chained URL may provide multiple selections for execution where different selections are intended to be executed within different frames of a browser display window. In this manner, the chained URL is applied to the navigation of a framed presentation of information to the user.

Figure 7:
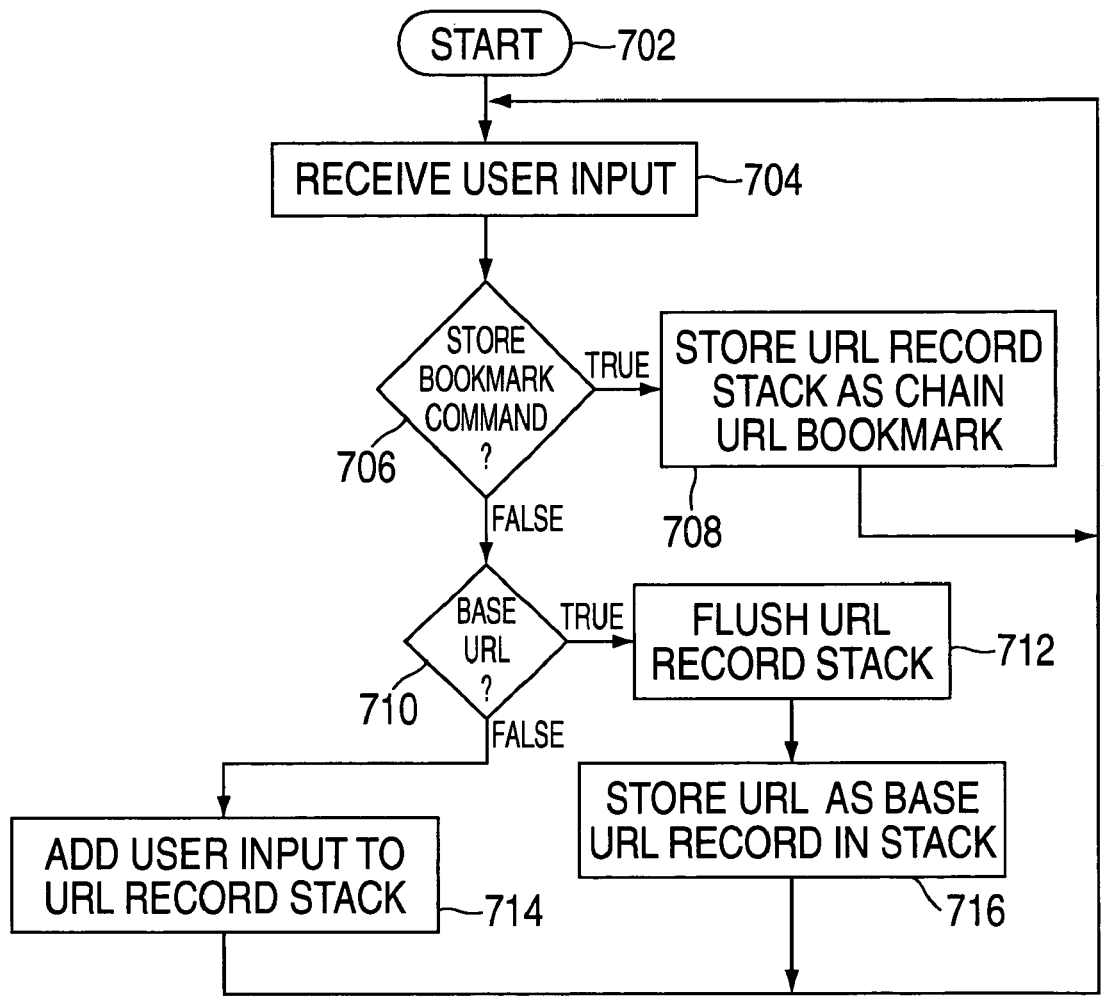
FIG. 7 depicts a flow diagram of a method for generating a browser bookmark using a chained URL.

FIG. 7 depicts a flow diagram of a method for generating a browser bookmark using a chained URL. The method 700 of FIG. 7 may be readily adapted for use in any browser program to allow for the storage of "bookmarks" or "favorites" (or similar data structures) including URLs.

The method 700 is entered at step 702 and proceeds to step 704, where user input is received. The method 700 then proceeds to step 706.

At step 706, a query is made as to whether a "store bookmark" command has been received at step 704. If the query is answered affirmatively, then the method 700 proceeds to step 708 where a URL record stack is stored as a chained URL bookmark. A URL record stack comprises a plurality of records, such as described in FIG. 3B. Each of the URL records includes at least a current URL field and a field for storing user input, such as line data, keyboard data and mouse data. The current URL field stores the address of the resource being modified by the user data. For each user interaction resulting in the retrieval of additional information from the server, from a local JAVA application or other processing, a new URL record is added to the URL record stack. The method 700 then proceeds to step 704. If the query at step 706 is answered negatively, then the method proceeds to step 710.

At step 710, a query is made as to whether the user input received at step 704 is indicative of a base URL. That is, at step 710 information received at step 704 is processed to determine whether a resulting URL is resolvable as a base URL. If the query at step 710 is answered negatively, then the method 700 proceeds to step 714. If the query at step 710 is answered affirmatively, then the method 700 proceeds to step 712.

At step 714, the user input received at step 704 is included within a URL record entry on a URL record stack being formed. As previously discussed, a URL record stack comprises a plurality of URL records where each URL record includes at least a current URL and any user input received in conjunction with that URL. The method 700 then proceeds to step 704.

At step 712, the URL record stack is flushed. That is, at step 712, the URL records forming the URL record stack are cleared. The method 700 then proceeds to step 716.

At step 716, the base URL entered by the user at step 704 and identified at step 710 is stored as the base URL in a base URL record. The base URL record forms the first record in a URL record stack. The method 700 then proceeds to step 704.

The above-described method advantageously provides for the formation of chained URLs to be used as bookmark or favorite entries within the browser environment. The method 700 reduces the size of the chained URL by determining whether user input causes retrieval of a resolvable URL, that is, whether user input retrieves a URL that may be considered as a base URL for a subsequent URL chain. In that case, the steps preceding such user input are not stored, thereby conserving memory.

While the foregoing is directed to the preferred embodiment of the present invention, other and further embodiments of the invention may be devised without departing from the basic scope thereof, and the scope thereof is determined by the claims that follow.

What is claimed is:

1. A computer-implemented method for use in a browser program, the method comprising:
    storing, for each user manipulation of a currently retrieved resource, data indicative of such user manipulation; and
    combining a network address of a base resource and a plurality of data structures each indicative of a sequential user manipulation of said base resource to form a compound network address, said compound network address suitable for retrieving a resource according to the stored user manipulations, wherein at least one user manipulation is stored using at least one coordinate of a pointer selection made by a user, wherein the pointer selection comprises a target network address of a resource retrieved by the user, and wherein at least one of the data structures includes a retrieve all components flag indicative of whether all components referenced by the data structure should be retrieved when accessing resource retrieved using the compound network address.

2. The method of claim 1, wherein said network addresses comprise uniform resource locators (URLs).

3. The method of claim 1, wherein said user manipulations comprise at least one of resource selections, line data pointing device selections and keyboard data.

4. The method of claim 3, wherein user manipulations comprising pointing device selections are defined in terms of pixel coordinates.

5. A uniform resource locator (URL) embodied in a computer-readable storage medium, comprising:
    a base URL and a sequence of executable selections;
    the base URL defining a location of a resource to be retrieved; and
    the sequence of executable selections defining a respective sequence of navigation selections to be executed, each of the sequence of selections being executed after a sequentially preceding selection has been executed, wherein at least one executable selection is stored using at least one coordinate of a pointer selection made by a user, wherein the pointer selection comprises a target network address of a resource retrieved by the user, and
    wherein the sequence of executable selections further defines, for each of the sequence of navigation selections:
        a content field, for storing the navigation selection,
        a type field, for storing an indication of the type of navigation selection included within the content field,
        a next record field, for identifying a next navigation selection within the sequence of navigation selections, and
        a retrieve all components flag indicative of whether all components associated with the navigation selection should be retrieved when executing the navigation selection.

6. The URL of claim 5, wherein the navigation selections comprise at least one of a URL, line data, a pointing device selection and keyboard data.

7. The URL of claim 5, further comprising a browser size field, for storing a display window size parameter.

8. A data structure embodied in a readable storage medium, comprising:
    a uniform resource locator (URL) chain header record comprising a base URL and a plurality of URL chain records, each of the URL chain records comprising a content field for storing an executable selection, the executable selection causing a present resource to be modified, wherein at least one URL chain record is stored using at least one coordinate of a pointer selection made by a user, wherein the pointer selection comprises a target network address of a resource retrieved by the user, and wherein each of the plurality of chain records defines:
        a content field, for storing the executable selection stored by a respective chain record,
        a type field, for storing an indication of the type of executable selection included within the content field,
        a next chain record field, for identifying a next chain record, of the plurality of chain records, and
        a retrieve all components flag indicative of whether all components associated with the executable selection of the respective chain record should be retrieved when executing a sequence of executable selections represented by the plurality of chain records.

9. The data structure of claim 8, wherein the URL chain record further comprises a type field indicative of the type of executable selection included within the content field.

10. The data structure of claim 9, wherein the type of executable content comprises at least one of a URL, line data, a pointing device selection and keyboard data.

11. The data structure of claim 10, wherein each of the URL chain records comprises a next record field for storing a pointer to a next URL chain record within the URL chain.

12. The data structure of claim 11, wherein the URL chain header record comprises a browser size field for storing an indication of an appropriate display window.

* * * * *